(12) United States Patent
Ohara et al.

(10) Patent No.: US 11,122,628 B2
(45) Date of Patent: Sep. 14, 2021

(54) USER EQUIPMENT APPARATUS, BASE STATION, AND RANDOM ACCESS METHOD

(71) Applicant: NTT DOCOMO, INC., Tokyo (JP)

(72) Inventors: Tomoya Ohara, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/474,744

(22) PCT Filed: Dec. 14, 2017

(86) PCT No.: PCT/JP2017/044848
§ 371 (c)(1),
(2) Date: Jun. 28, 2019

(87) PCT Pub. No.: WO2018/128064
PCT Pub. Date: Jul. 12, 2018

(65) Prior Publication Data
US 2019/0320471 A1 Oct. 17, 2019

(30) Foreign Application Priority Data
Jan. 6, 2017 (JP) .............................. JP2017-001461

(51) Int. Cl.
*H04W 74/08* (2009.01)
*H04L 1/18* (2006.01)
(Continued)

(52) U.S. Cl.
CPC ....... *H04W 74/0833* (2013.01); *H04L 1/1819* (2013.01); *H04W 52/36* (2013.01); *H04W 72/005* (2013.01); *H04W 72/046* (2013.01)

(58) Field of Classification Search
CPC . H04W 52/50; H04W 74/0833; H04W 88/02; H04W 52/48; H04W 72/005; H04W 72/046; H04W 16/28; H04W 52/36; H04B 7/088; H04B 7/0695; H04L 1/1819; H04L 1/08
See application file for complete search history.

(56) References Cited

U.S. PATENT DOCUMENTS

| | | | |
|---|---|---|---|
| 2014/0241285 A1* | 8/2014 | Pang | H04W 74/0833 370/329 |
| 2018/0041262 A1* | 2/2018 | Kang | H04B 7/063 |
| 2019/0268852 A1* | 8/2019 | Ryu | H04W 56/001 |

OTHER PUBLICATIONS

International Search Report issued in PCT/JP2017/044848 dated Mar. 13, 2018 (4 pages).

(Continued)

*Primary Examiner* — Kevin C. Harper
*Assistant Examiner* — Henry Baron
(74) *Attorney, Agent, or Firm* — Osha Bergman Watanabe & Burton LLP (57) ABSTRACT

In one aspect of the present invention, a user equipment apparatus includes a reception unit configured to receive, from a base station, control information indicating a pattern of retransmission schemes to be applied depending on a retransmission count, for retransmitting a preamble through random access to the base station, the retransmission schemes including beam switching and power ramping; and a transmission unit configured to transmit the preamble according to the control information at timing of retransmitting the preamble.

7 Claims, 6 Drawing Sheets

(51) Int. Cl.
    *H04W 52/36*     (2009.01)
    *H04W 72/04*     (2009.01)
    *H04W 72/00*     (2009.01)

(56) References Cited

OTHER PUBLICATIONS

Written Opinion of the International Searching Authority issued in PCT/JP2017/044848 dated Mar. 13, 2018 (3 pages).
Zte et al.; "WF on RACH Procedure"; 3GPP TSG RAN WG1 Meeting #87, R1-1613281; Reno, USA; Nov. 14-18, 2016 (3 pages).
Samsung; "NR 4-step random access procedure"; 3GPP TSG RAN WG1 NR Ad Hoc, R1-1700891; Spokane, Washington, USA; Jan. 16-20, 2017 (16 pages).

\* cited by examiner

USER EQUIPMENT APPARATUS, BASE STATION, AND RANDOM ACCESS METHOD

TECHNICAL FIELD

The present invention relates to a user equipment apparatus, a base station, and a random access method.

BACKGROUND ART

In 3GPP (Third Generation Partnership Project), a next-generation communication standard (5G or NR) following LTE (Long Term Evolution) and LTE-Advanced is under discussion. In an NR system, as in LTE and the like, it is expected that random access will be adopted when a user equipment apparatus (UE: User Equipment) establishes or reestablishes a connection to a base station (eNB or eNodeB).

According to LTE random access, a user equipment apparatus UE transmits a preamble (PRACH preamble) selected from a plurality of preambles available in a cell. When a base station eNB detects the preamble, the base station eNB transmits an RAR (RACH response) that is a response to the preamble. When the user equipment apparatus UE receives the RAR, the user equipment apparatus UE transmits an RRC Connection Request as a message 3. After the base station eNB receives the message 3, the base station eNB transmits an RRC Connection Setup including cell configuration information or the like for establishing a connection as a message 4. When the user equipment apparatus UE finds that its own UE ID is included in the message 4, the user equipment apparatus UE completes the random access process and establishes the connection.

In LTE, when the user equipment apparatus UE transmits a preamble but does not receives an RAR that is a response to the preamble, the user equipment apparatus UE retransmits the preamble by using a retransmission scheme called power ramping in which transmission power is increased by a predetermined step.

PRIOR-ART DOCUMENTS

Non-Patent Documents

[Non-Patent Document 1] 3GPP TSG RAN WG1 Meeting #87, R1-1613281, November 2016

DISCLOSURE OF INVENTION

Problem(s) to be Solved by the Invention

In an NR system, it is expected that transmit beamforming will be adopted for transmission of a preamble. With the adoption of transmit beamforming, it is expected that a transmission scheme called beam switching will be adopted, in which a beam used for retransmission is different from that of the previous transmission. It is also expected that a transmission scheme called a resource switching (RACH (random access channel) resource switching) will be adopted, in which a RACH resource used for retransmission is different from that of the previous transmission (see Non-Patent Document 1).

Compared to power ramping, beam switching has advantages that power consumption of a user equipment apparatus UE can be reduced, interference with another user equipment apparatus can be reduced, an appropriate beam can be used for subsequent communication, and so on. On the other hand, compared to beam switching, power ramping has advantages that it can be applied to an environment where properties of one beam do not significantly differ from those of another beam, it can be applied to the case where an omnidirectional beam or a nearly-omnidirectional beam is applicable, it can be applied to the case where a cell is large and a user equipment apparatus cannot communicate with a base station without using power ramping, and so on.

Thus, which of beam switching or power ramping is preferable for a retransmission scheme for a preamble in random access varies depending on an environmental condition of a user equipment apparatus UE, a cell design, and so on. By flexibly selecting a retransmission scheme for a preamble, the number of random access retransmissions can be reduced and thus efficient random access can be achieved.

It is an object of the present invention to achieve efficient random access by indicating a retransmission scheme for a preamble from a base station eNB to a user equipment apparatus UE, so that the user equipment apparatus UE retransmits the preamble according to the indicated retransmission scheme.

Means for Solving the Problem(s)

In one aspect of the present invention, there is provision for a user equipment apparatus, including:

a reception unit configured to receive, from a base station, control information indicating a pattern of retransmission schemes to be applied depending on a retransmission count, for retransmitting a preamble through random access to the base station, the retransmission schemes including beam switching and power ramping; and a transmission unit configured to transmit the preamble according to the control information at timing of retransmitting the preamble.

Advantageous Effect of the Invention

According to the present invention, it is possible to achieve efficient random access by indicating a retransmission scheme for a preamble from a base station eNB to a user equipment apparatus UE, so that the user equipment apparatus UE retransmits the preamble according to the indicated retransmission scheme.

DETAILED DESCRIPTION OF THE PREFERRED EMBODIMENTS

Embodiments of the present invention are described below with reference to the drawings. The embodiments described below are merely examples, and an embodiment to which the present invention can be applied is not limited to these embodiments.

It is assumed that a radio communication system according to the embodiments of the present invention supports at least an LTE communication system. For this reason, the existing technologies defined in LTE can be used for operation of the radio communication system as needed. It should be noted that the existing technologies are not limited to the technologies defined in LTE. As used herein, "LTE" has broader meaning including LTE-Advanced or later, unless otherwise specified. Further, the present invention can be applied to a system other than LTE to which random access is applied.

In the embodiments of the present invention, terms defined in LTE such as RACH, preamble, beamforming, and power ramping are used for convenience of explanation. Signals, functions, and so on represented by these terms may be differently termed.

Overview of Radio Communication System

Figure 1:
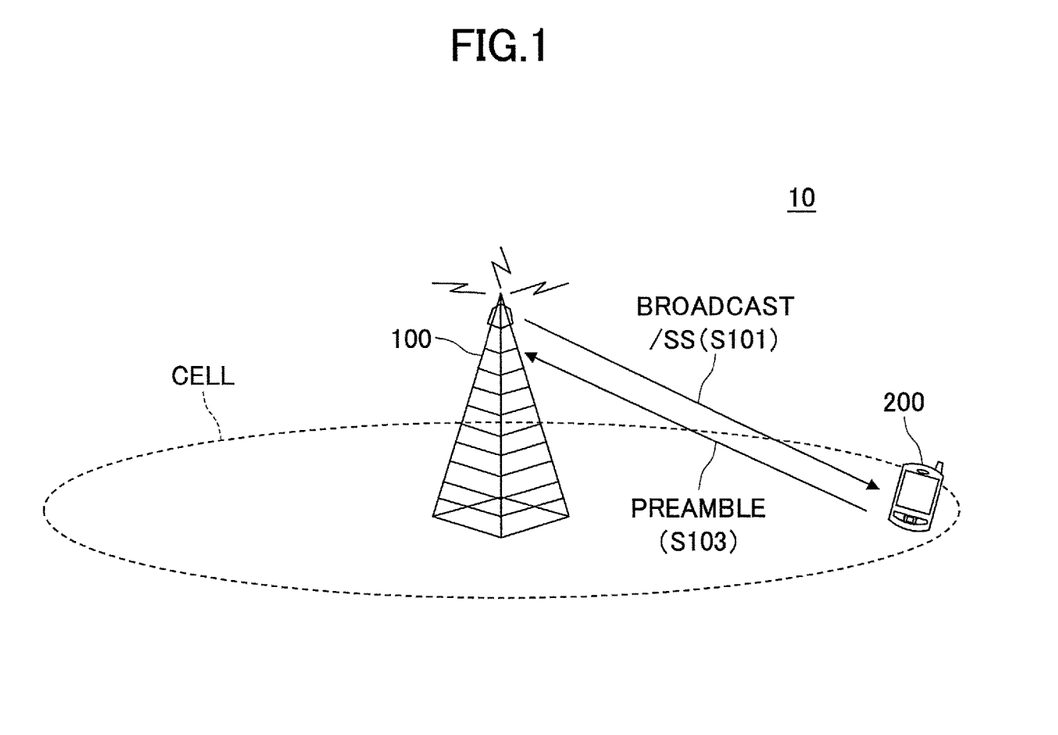
FIG. 1 is a configuration diagram of a radio communication system according to an embodiment of the present invention.

FIG. 1 is a configuration diagram of a radio communication system 10 according to an embodiment of the present invention. The radio communication system 10 according to this embodiment includes a base station 100 and a user equipment apparatus 200. While a single base station 100 and a single user equipment apparatus 200 are illustrated in FIG. 1, a plurality of base stations 100 or a plurality of user equipment apparatuses 200 may be included. The base station 100 may be referred to as "BS" and the user equipment apparatus 200 may be referred to as "UE".

The base station 100 can accommodate one or more (for example, three) cells (also referred to as "sectors"). When the base station 100 accommodates a plurality of cells, the entire coverage area of the base station 100 can be divided into a plurality of small areas, and in each small area, a communication service can be provided through a base station subsystem (for example, a small indoor base station remote radio head (RRH)). The term "cell" or "sector" refers to a part or whole of the coverage area in which the base station and/or the base station subsystem provides a communication service. Further, the terms "base station", "eNB", "cell", and "sector" can be used interchangeably in this specification. In some cases, the base station 100 is also referred to as a fixed station, a NodeB, an eNodeB (eNB), an access point, a femto cell, a small cell, or the like.

In some cases, the user equipment apparatus 200 is referred to as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or any other suitable term by those skilled in the art.

When the user equipment apparatus 200 establishes a connection to the base station 100 or re-synchronizes with the base station 100 for originating a call, for handover, or the like, random access is performed. In random access, a channel used to initially transmit a preamble is called a PRACH (Physical Random Access Channel). In this embodiment, it is assumed that transmit beamforming can be used in random access. Transmit beamforming is a technology for improving a radio field intensity by transmitting a highly directional beam to a communication party on the other end.

Figure 2:
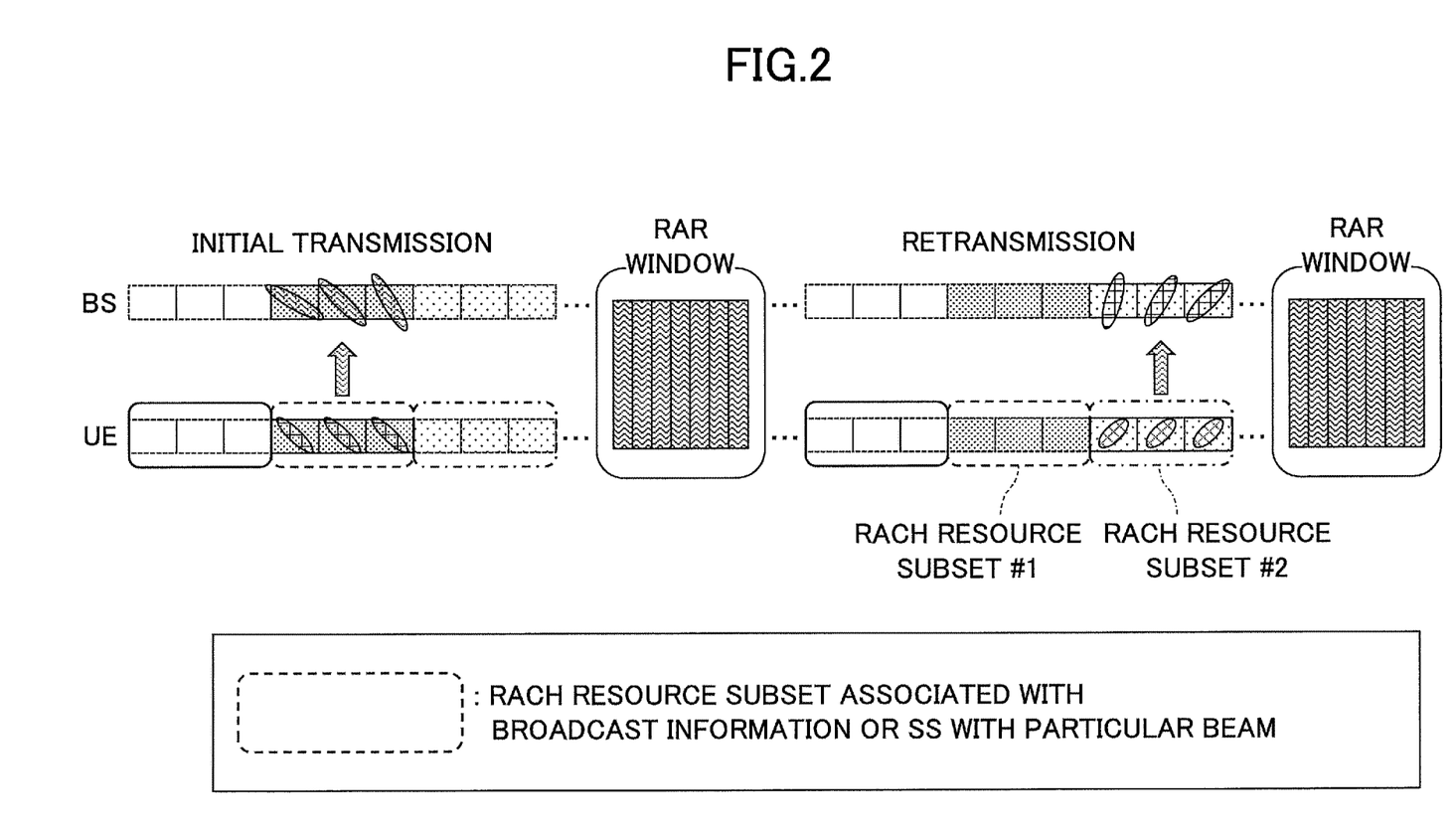
FIG. 2 is a diagram illustrating RACH resource subsets used for transmitting a preamble.

The base station 100 transmits broadcast information or an SS (Synchronization Signal) by changing a transmission beam according to beam sweeping (S101). From multiple sets of broadcast information or SSs transmitted from the base station according to beam sweeping, the user equipment apparatus 200 selects broadcast information or an SS with a transmission beam for optimal reception by the user equipment apparatus 200. For example, as illustrated in FIG. 2, the user equipment apparatus 200 selects a RACH resource subset (locations of time and frequency resources or the like) associated with broadcast information or an SS with a particular beam.

The user equipment apparatus 200 transmits a preamble which is randomly selected from a plurality of preambles in the RACH resource subset associated with the selected broadcast information or the selected SS (S103). When the base station 100 detects the preamble, the base station 100 transmits an RAR that is a response to the preamble. The base station 100 can identify the optimal beam based on the RACH resource subset in which the preamble is transmitted.

When the user equipment apparatus 200 transmits the preamble but does not receive an RAR that is a response to the preamble during a period called an RAR window, the user equipment apparatus 200 retransmits the preamble. In this embodiment, it is assumed that the following three retransmission schemes can be used to retransmit the preamble in the case where transmit beamforming can be used.

(1) Power ramping: transmission power for retransmission is increased compared to transmission power for the previous transmission. Since power ramping can be used together with beam switching in this embodiment, power ramping includes a scheme in which transmission power for each beam is stored and transmission power for retransmission is increased compared to transmission power for the previous transmission with the same beam, and a scheme in which transmission power for retransmission is increased compared to transmission power for the previous transmission regardless of the beam.

(2) Beam switching: a beam used for retransmission is different from that of the previous transmission. For example, when a plurality of beams are used in single transmission, beam switching includes a scheme in which a set of beams used for retransmission is different from that of the previous transmission.

(3) Resource switching: a RACH resource used for retransmission is different from that of the previous transmission. Resource switching includes a scheme in which another RACH resource subset (for example, a RACH resource subset #2 illustrated in FIG. 2) associated with different broadcast information or a different SS is used for retransmission, a scheme in which frequency hopping is applied to retransmission in the frequency domain within the RACH resource subset (for example, a RACH resource subset #1 illustrated in FIG. 2) associated with the same broadcast information or the same SS, and a combination of them.

These three retransmission schemes may be combined as needed. For example, it is possible to increase transmission power for retransmission with a beam different from that of the previous transmission (a combination of power ramping and beam switching), to increase transmission power for retransmission with a RACH resource different from that of the previous transmission (a combination of power ramping and resource switching), to use a beam for retransmission which is different from that of the previous transmission with a RACH resource different from that of the previous transmission (a combination of beam switching and resource switching), and to increase transmission power for retransmission with a beam and a RACH resource different from those of the previous transmission (a combination of power ramping, beam switching, and resource switching).

Random Access Procedure in Radio Communication System

Figure 3:
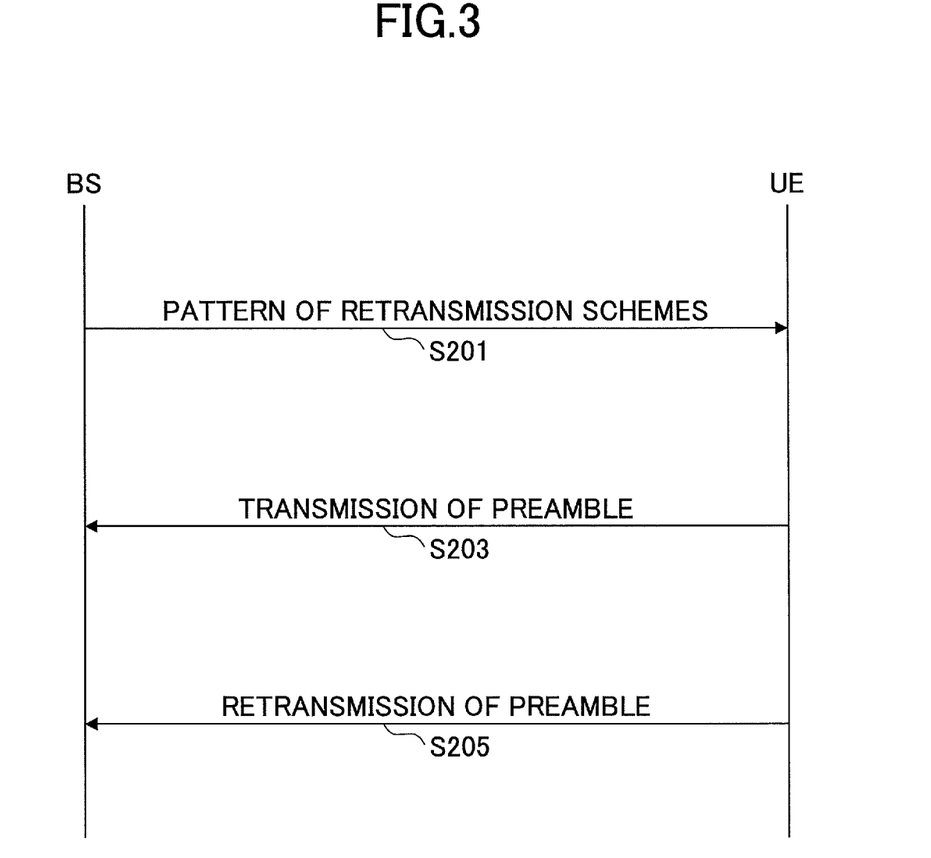
FIG. 3 is a sequence diagram illustrating a random access procedure in a radio communication system according to an embodiment of the present invention.

A procedure to flexibly apply these retransmission schemes is described below. FIG. 3 is a sequence diagram illustrating a random access procedure in a radio communication system according to an embodiment of the present invention.

The base station 100 generates control information indicating a pattern of retransmission schemes usable by the user equipment apparatus 200 to retransmit a preamble through random access, and transmits the control information (S201). The control information may be transmitted from the base station 100 to the user equipment apparatus 200 via broadcast information or an SS, via RRC (Radio Resource Control) signaling, or via DCI (Downlink Control Information) or the like. Further, the control information may be transmitted from the base station 100 to the user equipment apparatus 200 via a combination of broadcast information or an SS, RRC signaling, DCI, or the like. When a combination of them is used, the user equipment apparatus 200 may select control information according to a predetermined priority level. For example, when control information is provided via broadcast information or an SS and then control information is provided via RRC signaling or DCI, the control information provided via RRC signaling or DCI may be prioritized and the control information provided via the broadcast information or the SS may be discarded. Such priority levels are merely an example and any priority levels may be used.

The control information indicates a pattern of retransmission schemes to be applied depending on a retransmission count, and the retransmission schemes include beam switching and power ramping and may also include resource switching. The control information indicates a pattern of retransmission schemes to be applied up to a maximum retransmission count of the preamble. For example, the control information indicates whether beam switching or power ramping is applied at a first retransmission count, whether beam switching or power ramping is applied at a second retransmission count, and so on. As described above, the retransmission scheme to be applied is not limited to beam switching and power ramping and may include resource switching and a combination of them. Alternatively, the control information may indicate a retransmission scheme to be preferentially applied.

The user equipment apparatus 200 receives the control information from the base station 100 and transmits a preamble (S203). At timing of retransmitting the preamble, the user equipment apparatus 200 retransmits the preamble according to the control information (S205).

Figure 4:
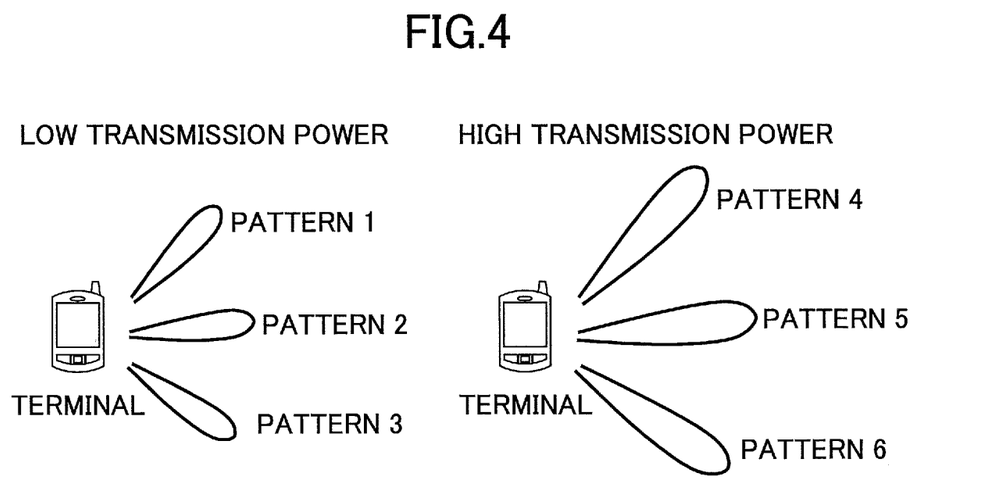
FIG. 4 is a diagram illustrating a pattern of retransmission schemes in the case where beam switching is prioritized.

FIG. 4 is a diagram illustrating a pattern of retransmission schemes in the case where beam switching is prioritized. In this example, it is assumed that two transmission power levels (high transmission power and low transmission power) and three transmission beams can be used. In the case where beam switching is prioritized, at a first retransmission count, that is, at a second transmission count, beam switching is applied so that the preamble is transmitted with the same transmission power as the initial transmission and with a different beam (pattern 2 in FIG. 4). At a second retransmission count, that is, at a third transmission count, beam switching is also applied so that the preamble is transmitted with the same transmission power as the initial transmission and with a different beam (pattern 3 in FIG. 4). Upon completion of beam switching, at a third retransmission count, that is, at a fourth transmission count, power ramping is applied so that the preamble is transmitted with the same beam as the initial transmission and with higher transmission power (pattern 4 in FIG. 4). At a fourth retransmission count, that is, at a fifth transmission count, power ramping is applied so that the preamble is transmitted with the same beam as the first retransmission (second transmission) and with higher transmission power (pattern 5 in FIG. 4). At a fifth retransmission count, that is, at a sixth transmission count, power ramping is applied so that the preamble is transmitted with the same beam as the second retransmission (third transmission) and with higher transmission power (pattern 6 in FIG. 4).

Figure 5:
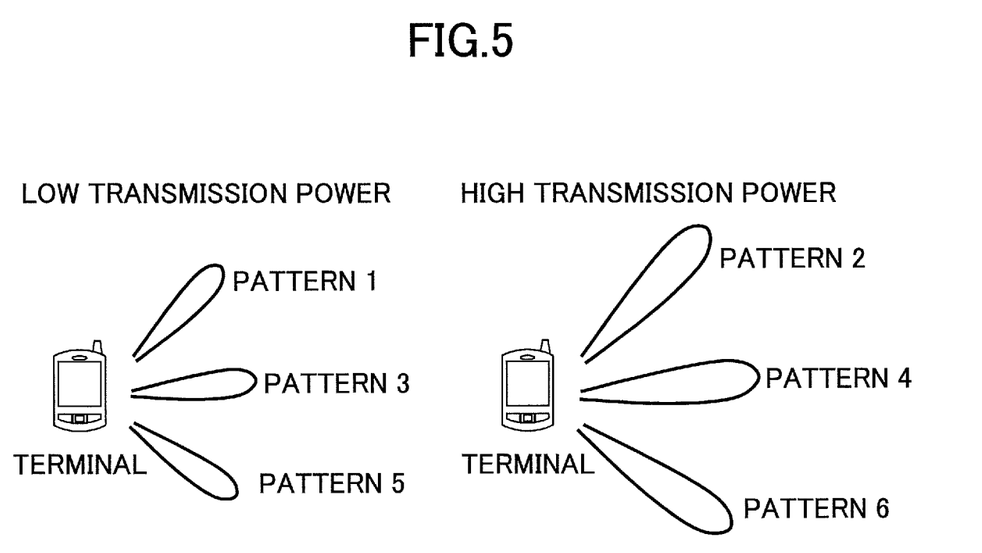
FIG. 5 is a diagram illustrating a pattern of retransmission schemes in the case where power ramping is prioritized.

FIG. 5 is a diagram illustrating a pattern of retransmission schemes in the case where power ramping is prioritized. In this example, it is assumed that two levels of transmission power (high transmission power and low transmission power) and three transmission beams can be used. In the case where power ramping is prioritized, at a first retransmission count, that is, at a second transmission count, power ramping is applied so that the preamble is transmitted with the same beam as the initial transmission and with higher transmission power (pattern 2 in FIG. 5). Upon completion of power ramping, at a second retransmission count, that is, at a third transmission count, beam switching is applied so that the preamble is transmitted with the same transmission power as the initial transmission and with a different beam (pattern 3 in FIG. 5). At a third retransmission count, that is, at a fourth transmission count, power ramping is applied so that the preamble is transmitted with the same beam as the second retransmission (third transmission) and with higher transmission power (pattern 4 in FIG. 5). Similarly, at a fourth retransmission count, that is, at a fifth transmission count, beam switching is applied so that the preamble is transmitted with the same transmission power as the initial transmission and with a different beam (pattern 5 in FIG. 5). At a fifth retransmission count, that is, at a sixth transmission count, power ramping is applied so that the preamble is transmitted with the same beam as the fourth retransmission (fifth transmission) and with higher transmission power (pattern 6 in FIG. 5).

In the examples illustrated in FIGS. 4 and 5, a different beam or different transmission power is used with each increase in a retransmission count. However, the preamble may be transmitted more than once with the same beam or the same transmission power because of reception beam sweeping in the base station 100 or the like. For example, in the example illustrated in FIG. 4, it is possible to define a pattern of retransmission schemes in which the pattern 1 is used at the initial transmission and a first retransmission, the pattern 2 is used at a second retransmission and a third retransmission, and so on.

Further, a combination of beam switching and power ramping may be selectively defined. For example, in the example where two levels of transmission power (high transmission power and low transmission power) and three transmission beams can be used, beam switching may be applied twice, then power ramping may be applied, there-after the remaining beam switching may be applied, and then the remaining power ramping may be applied.

The base station 100 may receive a terminal aspect from the user equipment apparatus 200 before transmitting control information indicating a pattern of retransmission schemes. For example, the terminal aspect includes the number of antennas in the user equipment terminal 200, a category of the user equipment terminal 200, a terminal capability of the user equipment apparatus 200, a type of the user equipment terminal 200, or the like. The base station 100 may determine the pattern of retransmission schemes based on the terminal aspect. For example, when the terminal aspect specifies that a battery capacity of the user equipment apparatus 200 is limited, beam switching may be prioritized because it has an effect of reducing power consumption. Alternatively or in addition, the base station 100 may determine the pattern of retransmission schemes based on a base station aspect such as the number of antennas in the base station 100, a cell size of the base station 100, or the like. For example, when the base station aspect specifies that the cell size is large, power ramping may be prioritized.

Instead of receiving a terminal aspect from the user equipment apparatus 200, the base station 100 may provide information about a pattern of retransmission schemes for each terminal aspect to the user equipment apparatus 200. For example, information in a table form defining a pattern of retransmission schemes used when the number of antennas is more than or equal to two and less than four, a pattern of retransmission schemes used when the number of antennas is more than or equal to four and less than eight, and so on may be provided to the user equipment apparatus 200. Alternatively, a retransmission scheme to be preferentially applied for each terminal aspect may be provided to the user equipment apparatus 200. The information about a pattern of retransmission schemes for each terminal aspect may be provided from the base station 100 to the user equipment apparatus 200 via broadcast information or an SS, via RRC signaling, or via DCI or the like. Alternatively, the information about a pattern of retransmission schemes for each terminal aspect may be defined in advance in the system as a specification. Further, the information about a pattern of retransmission schemes for each terminal aspect may be provided from the base station 100 to the user equipment apparatus 200 via a combination of broadcast information or an SS, RRC signaling, DCI, or the like. When a combination of them is used, the user equipment apparatus 200 may select information according to a predetermined priority level. For example, when information about a pattern of retransmission schemes for each terminal aspect is provided via broadcast information or an SS and then information about a pattern of retransmission schemes for each terminal aspect is provided via RRC signaling or DCI, the information provided via RRC signaling or DCI may be prioritized and the information provided via the broadcast information or the SS may be discarded. Such priority levels are merely an example and any priority levels may be used.

It is also possible to allow the user equipment apparatus 200 to determine a retransmission scheme to be preferentially applied based on the terminal aspect. When the user equipment apparatus 200 determines a retransmission scheme to be preferentially applied, an indicator called UE beam correspondence may be used, for example. The UE beam correspondence indicates whether the user equipment apparatus 200 can use the same transmission beam as an optimal reception beam by utilizing a symmetric property (reciprocity) between a transmission beam and a reception beam. When the user equipment apparatus 200 can utilize reciprocity, there is a high possibility that a transmission beam with high accuracy can be used. In this case, the need for beam switching is less. Thus, even if the base station 100 indicates that beam switching is to be preferentially applied, the user equipment apparatus 200 may preferentially apply power ramping.

The base station 100 may provide information about a maximum retransmission count to the user equipment apparatus 200. For example, the information about a maximum retransmission count may be a maximum retransmission count per transmission beam, in other words, a maximum power ramping count per transmission beam. While the number of beams depends on the number of antennas in the user equipment apparatus 200, the maximum retransmission count is basically equal to (the number of beams)*(a maximum retransmission count per transmission beam), and the user equipment apparatus 200 can retransmit the preamble up to the maximum retransmission count.

Alternatively, information about a maximum retransmission count may be a maximum retransmission count for all transmission beams. The maximum retransmission count for all transmission beams may be provided instead of the maximum retransmission count per transmission beam or in addition to the maximum retransmission count per transmission beam.

The maximum retransmission count per transmission beam or the maximum retransmission count for all transmission beams may be defined as a maximum retransmission count per RACH resource subset or a maximum retransmission count for all RACH resource subsets. As described above, according to resource switching, a different RACH resource subset can be used for retransmission. A maximum retransmission count may be defined for each RACH resource subset or for all RACH resource subsets. Further, even within the same RACH resource subset, according to resource switching, a different RACH resource location can be used for retransmission by frequency hopping in the frequency domain, for example. In this case, a maximum retransmission count may be defined for each RACH resource location or may be defined independently of a RACH resource location.

The information about a maximum retransmission count may be provided from the base station 100 to the user equipment apparatus 200 via broadcast information or an SS, via RRC signaling, or via DCI or the like. Alternatively, the information about a maximum retransmission count may be defined in advance in the system as a specification. Further, the information about a maximum retransmission count may be provided from the base station 100 to the user equipment apparatus 200 via a combination of broadcast information or an SS, RRC signaling, DCI, or the like. When a combination of them is used, the user equipment apparatus 200 may select information according to a predetermined priority level. For example, when information about a maximum retransmission count is provided via broadcast information or an SS and then information about a maximum retransmission count is provided via RRC signaling or DCI, the information provided via RRC signaling or DCI may be prioritized and the information provided via the broadcast information or the SS may be discarded. Such priority levels are merely an example and any priority level may be used.

Functional Configuration of Base Station

Figure 6:
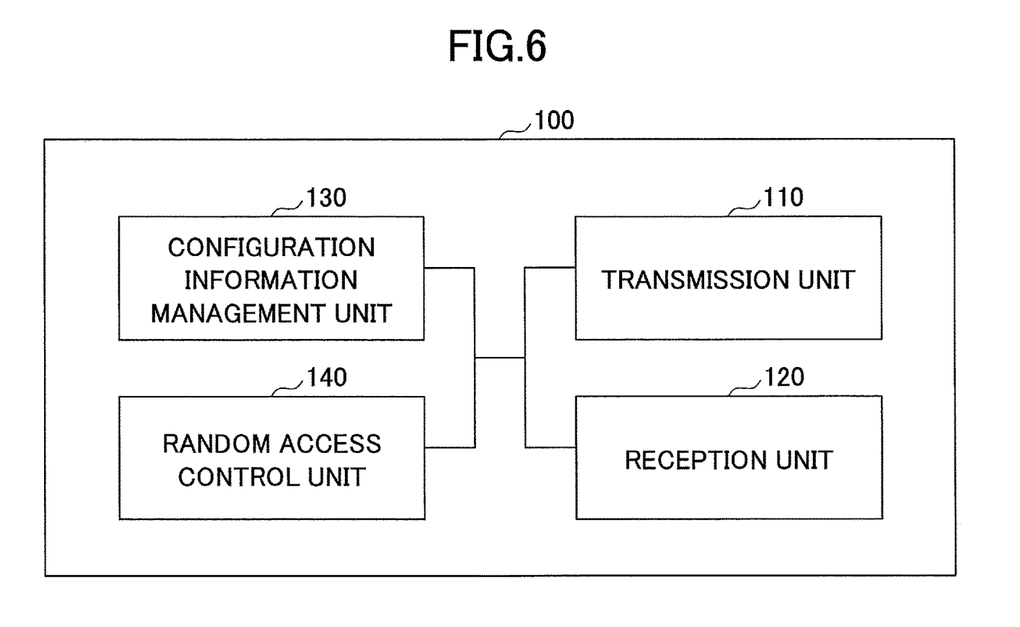
FIG. 6 is a block diagram illustrating an exemplary functional configuration of a base station.

FIG. 6 is a block diagram illustrating an exemplary functional configuration of a base station 100. The base station 100 includes a transmission unit 110, a reception unit 120, a configuration information management unit 130, and a random access control unit 140. The functional configuration illustrated in FIG. 6 is merely an example. The functional division and names of the functional units are not limited to the example illustrated in FIG. 6 as long as the operations according to the embodiment can be performed.

The transmission unit 110 is configured to generate a lower-layer signal from higher-layer information and wirelessly transmit the signal. The reception unit 120 is configured to wirelessly receive various signals and obtain higher-layer information from the received signals.

The configuration information management unit 130 stores predefined configuration information. The configuration information management unit 130 also determines configuration information (control information indicating a pattern of retransmission schemes, information about a maximum retransmission count, information about a pattern of retransmission schemes for each terminal aspect, or the like) to be dynamically and/or semi-statically provided to the user equipment apparatus 200 and stores the configuration information. The configuration information management unit 130 sends to the transmission unit 110 the configuration information to be dynamically and/or semi-statically provided to the user equipment apparatus 200 to cause the transmission unit 110 to transmit the configuration information.

The random access control unit 140 manages a random access procedure for the user equipment apparatus 200. When the random access control unit 140 receives a preamble from the user equipment apparatus 200, the random access control unit 140 causes the transmission unit 110 to transmit an RAR. When the random access control unit 140 receives an RRC Connection Request from the user equipment apparatus 200, the random access control unit 140 causes the transmission unit 110 to transmit an RRC Connection Setup.

Functional Configuration of User Equipment Apparatus

Figure 7:
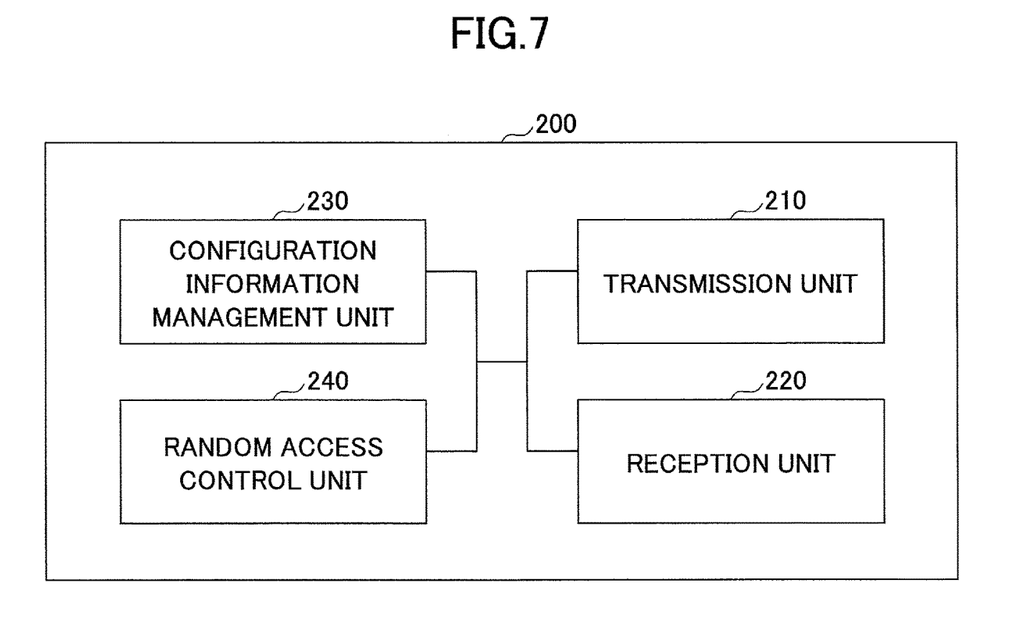
FIG. 7 is a block diagram illustrating an exemplary functional configuration of a user equipment apparatus.

FIG. 7 is a block diagram illustrating an exemplary functional configuration of a user equipment apparatus 200. The user equipment apparatus 200 includes a transmission unit 210, a reception unit 220, a configuration information management unit 230, and a random access control unit 240. The functional configuration illustrated in FIG. 7 is merely an example. The functional division and names of the functional units are not limited to the example illustrated in FIG. 7 as long as the operations according to the embodiment can be performed.

The transmission unit 210 is configured to generate a lower-layer signal from higher-layer information and wirelessly transmit the signal. The transmission unit 210 may transmit a terminal aspect to the base station 100. Based on configuration information stored in the configuration information management unit 230 as described below, the transmission unit 210 applies beam switching, power ramping, or resource switching at timing of retransmitting a preamble and transmits the preamble. The transmission unit 210 may apply beam switching, power ramping, or resource switching based on a terminal aspect of the user equipment apparatus 200 such as information about reciprocity. The reception unit 220 is configured to wirelessly receive various signals and obtain higher-layer information from the received signals. The reception unit 220 receives configuration information (control information indicating a pattern of retransmission schemes, information about a maximum retransmission count, information about a pattern of retransmission schemes for each terminal aspect, or the like) from the base station 100 or the like.

The configuration information management unit 230 stores predefined configuration information and the configuration information (control information indicating a pattern of retransmission schemes, information about a maximum retransmission count, or the like) dynamically and/or semi-statically provided from the base station 100 or the like.

The random access control unit 240 manages a random access procedure for the base station 100. When the user equipment apparatus 200 establishes a connection to the base station 100 or re-synchronizes with the base station 100 for originating a call, for handover, or the like, the random access control unit 240 causes the transmission unit 210 to transmit a preamble randomly selected from a plurality of preambles. Further, when the preamble is transmitted but the random access control unit 240 does not receive an RAR that is a response to the preamble within a period called an RAR window, for example, the random access control unit 240 causes the transmission unit 210 to retransmit the preamble. The preamble may be retransmitted up to a maximum retransmission count. When the random access control unit 240 receives an RAR from the base station 100, the random access control unit 240 causes the transmission unit 210 to transmit an RRC Connection Request.

Hardware Configuration

The block diagrams used to describe the above-mentioned embodiment illustrate blocks of functional units. The functional blocks (components) are implemented by an arbitrary combination of hardware and/or software. A means for implementing each functional block is not particularly limited. That is, each functional block may be implemented by one apparatus in which a plurality of elements are physically and/or logically coupled or by a plurality of apparatuses that are physically and/or logically separated from each other and are connected directly and/or indirectly (for example, in a wired manner and/or wirelessly).

Figure 8:
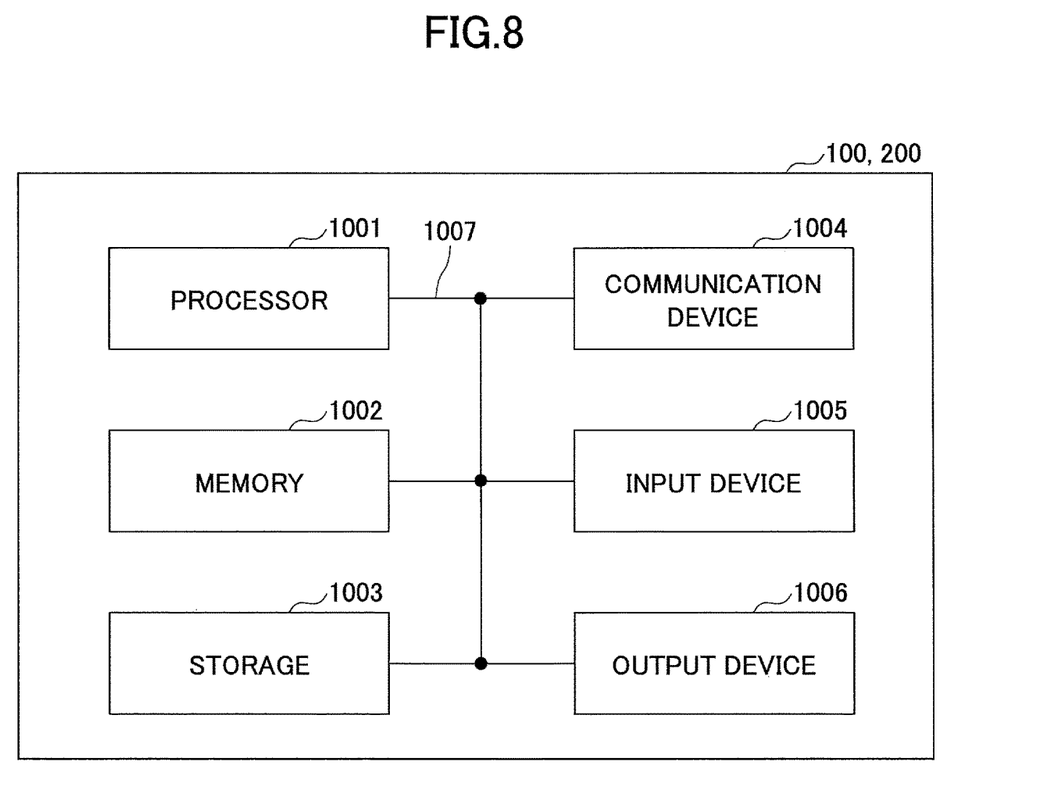
FIG. 8 is a block diagram illustrating an exemplary hardware configuration of a radio communication apparatus according to an embodiment of the present invention.

For example, the base station, the user equipment apparatus, or the like according to the embodiment of the invention may function as a computer that performs a random access method according to this embodiment. FIG. 8 is a diagram illustrating an example of a hardware configuration of the base station 100 or the user equipment apparatus 200 according to this embodiment. Each of the base station 100 and the user equipment apparatus 200 may be physically configured as a computer device including, for example, a processor 1001, a memory 1002, a storage 1003, a communication device 1004, an input device 1005, an output device 1006, and a bus 1007.

In the following description, the term "device" can be substituted with, for example, a circuit, an apparatus, or a unit. The hardware configuration of the base station 100 or the user equipment apparatus 200 may include one or a plurality of devices illustrated in FIG. 8 or may not include some of the devices.

Each function of the base station 100 and the user equipment apparatus 200 may be implemented by the following process: predetermined software (program) is read onto hardware such as the processor 1001 or the memory 1002, and the processor 1001 performs an operation to control the communication of the communication device 1004 and the reading and/or writing of data from and/or to the memory 1002 and the storage 1003.

The processor 1001 operates, for example, an operating system to control the overall operation of the computer. The processor 1001 may be a central processing unit (CPU) including, for example, an interface with peripheral devices, a control device, an arithmetic device, and a register. For example, the transmission unit 110, the reception unit 120, the configuration information management unit 130, and the random access control unit 140 in the base station 100, as well as the transmission unit 210, the reception unit 220, the configuration information management unit 230, and the random access control unit 240 in the user equipment apparatus 200 may be implemented in the processor 1001.

The processor 1001 reads a program (program code), a software module, and/or data from the storage 1003 and/or the communication device 1004 to the memory 1002 and performs various types of processes according to the program, the software module, or the data. A program that causes a computer to perform at least some of the operations described in the embodiment may be used. For example, the transmission unit 110, the reception unit 120, the configuration information management unit 130, and the random access control unit 140 in the base station 100, as well as the transmission unit 210, the reception unit 220, the configuration information management unit 230, and the random access control unit 240 in the user equipment apparatus 200 may be implemented by a control program that is stored in the memory 1002 and is executed by the processor 1001. The other functional blocks may be similarly implemented. In the embodiment, the above-mentioned various processes are performed by one processor 1001. However, the processes may be simultaneously or sequentially performed by two or more processors 1001. The processor 1001 may be mounted on one or more chips. The program may be transmitted over the network through a telecommunication line.

The memory 1002 is a computer-readable recording medium and may include, for example, at least one of a read only memory (ROM), an erasable programmable ROM (EPROM), an electrically erasable programmable ROM (EEPROM), and a random access memory (RAM). The memory 1002 may be also referred to as, for example, a register, a cache, or a main memory (main storage device). The memory 1002 can store, for example, an executable program (program code) and a software module that can perform a random access method according to the embodiment of the invention.

The storage 1003 is a computer-readable recording medium and may include, for example, at least one of an optical disk such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may be also referred to as an auxiliary storage device. The above-mentioned storage medium may be, for example, a database, a server, and other suitable media including the memory 1002 and/or the storage 1003.

The communication device 1004 is hardware (a transmission and reception device) for communicating with a computer through a wired and/or wireless network and is also referred to as, for example, a network device, a network controller, a network card, or a communication module. For example, the transmission unit 110, the reception unit 120, the transmission unit 210, the reception unit 220, and the like may be implemented by the communication device 1004.

The input device 1005 is an input unit (for example, a keyboard, a mouse, a microphone, a switch, a button, or a sensor) that receives an input from the outside. The output device 1006 is an output unit (for example, a display, a speaker, or an LED lamp) that performs an output process to the outside. The input device 1005 and the output device 1006 may be integrated into a single device (for example, a touch panel).

Devices such as the processor 1001 and/or the memory 1002 are connected to each other via the bus 1007 for information communication. The bus 1007 may be a single bus or the devices may be connected to each other by different buses.

Each of the base station 100 and the user equipment apparatus 200 may include hardware such as a microprocessor, a digital signal processor (DSP), an application specific integrated circuit (ASIC), a programmable logic device (PLD), and a field programmable gate array (FPGA). Some or all of the functional blocks may be implemented by the hardware. For example, the processor 1001 may be implemented by at least one of these hardware components.

Effects of Embodiments

According to an embodiment of the present invention, it is possible to achieve efficient random access by indicating a retransmission scheme for a preamble from a base station to a user equipment apparatus, so that the user equipment apparatus retransmits the preamble according to the indicated retransmission scheme. The patter of retransmission schemes may be determined based on a terminal aspect and/or base station aspect, and as a result, a suitable retransmission scheme can be determined depending on an environmental condition of the user equipment apparatus, a cell design, or the like, for example.

By prioritizing beam switching in the pattern of retransmission schemes, it is expected that power consumption of a user equipment apparatus UE can be reduced, interference with another user equipment apparatus can be reduced, an appropriate beam can be used for subsequent communication, and so on. On the other hand, by prioritizing power ramping in the pattern of retransmission schemes, it is expected that retransmission efficiency can be improved in an environment where properties of one beam do not significantly differ from those of another beam, retransmission efficiency can be improved in the case where an omnidirectional beam or a nearly-omnidirectional beam is applicable, retransmission efficiency can be improved in the case where a cell is large and a user equipment apparatus cannot communicate with a base station without using power ramping, and so on.

By further combining resource switching, it is possible to flexibly determine a maximum retransmission count according to the retransmission schemes. For example, combining resource switching can increase the maximum retransmission count compared to the case without resource switching, and as a result, communication using a combination of a suitable transmission beam and a suitable resource can be realized.

Supplementary Explanation

Each aspect/embodiment described in the specification may be applied to systems using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wide-Band (UWB), Bluetooth (registered trademark), and other suitable systems and/or next-generation systems that have functionality enhanced based on these systems.

The terms "system" and "network" used in the specification are interchangeably used.

In the specification, a specific operation performed by the base station may be performed by an upper node of the base station. In a network having one or a plurality of network nodes including the base station, it is clearly understood that various operations performed for communication with the user equipment apparatus can be performed by the base station and/or a network node (for example, including an MME or an S-GW without limitation) other than the base station. The number of network nodes other than the base station is not limited to one, and a plurality of other network nodes (for example, an MME and an S-GW) may be combined with each other.

Information or the like can be output from a higher layer (or a lower layer) to a lower layer (or a higher layer). Information or the like may be input or output via a plurality of network nodes.

The input or output information or the like may be stored in a specific location (for example, a memory) or may be managed in a management table. The input or output information or the like may be overwritten, updated, or edited. The output information or the like may be deleted. The input information or the like may be transmitted to another apparatus.

The transmission of information is not limited to the aspects/embodiments described in the specification and may be performed by other means. For example, the transmission of information may be performed by physical layer signaling (for example, downlink control information (DCI) or uplink control information (UCI)), higher layer signaling (for example, radio resource control (RRC) signaling, medium access control (MAC) signaling, or broadcast information (a master information block (MIB) and a system information block (SIB))), another signal, or a combination thereof. The RRC signaling may be also referred to as an RRC message and may be, for example, an RRC connection setup message or an RRC connection reconfiguration message.

Determination may be made based on a value (0 or 1) represented by 1 bit, may be made based on a true or false value (boolean: true or false), or may be made based on comparison with a numerical value (for example, comparison with a predetermined value).

Regardless of the fact that software is referred to as software, firmware, middleware, a microcode, a hardware description language, or another name, the software is broadly interpreted to include an instruction, an instruction set, a code, a code segment, a program code, a program, a sub-program, a software module, an application, a software application, a software package, a routine, a subroutine, an object, an executable file, an execution thread, a procedure, a function, or the like.

Software, an instruction, or the like may be transmitted or received via a transmission medium. For example, when software is transmitted from a website, a server, or another remote source using a wired technology such as a coaxial cable, an optical cable, a twisted pair, and a digital subscriber line (DSL) and/or a wireless technology such as an infrared ray, radio, and microwaves, the wired technology and/or the wireless technology is included in the definition of a transmission medium.

The information, the signal, and the like described in the specification may be represented using any of various technologies. For example, the data, the instruction, the command, the information, the signal, the bit, the symbol, the chip, and the like mentioned throughout the description may be represented by a voltage, a current, an electromagnetic wave, a magnetic field, or a magnetic particle, an optical field or a photon, or any combination thereof.

The terms described in the specification and/or terms necessary to understand the specification may be replaced with terms that have same or similar meanings. For example, a channel and/or a symbol may be a signal. A signal may be a message. A component carrier (CC) may be referred to as a carrier frequency, a cell, or the like.

The information, the parameter, or the like described in the specification may be represented by an absolute value, may be represented by a relative value from a predetermined value, or may be represented by another piece of corresponding information. For example, a radio resource may be indicated using an index.

The names used for the above-described parameters are not limited in any respect. Further, a numerical expression or the like in which the parameters are used can be different from the numerical expression disclosed explicitly in the specification. Since various channels (for example, a PUCCH and a PDCCH) and information elements (for example, TPC) can be identified with any suitable names, various names allocated to the various channels and the information elements are not limited in any respect.

The terms "determining" and "deciding" used in the specification include various operations. The terms "determining" and "deciding" can include, for example, "determination" and "decision" for calculating, computing, processing, deriving, investigating, looking-up (for example, looking-up in a table, a database, or another data structure), and ascertaining operations. In addition, the terms "determining" and "deciding" can include "determination" and "decision" for receiving (for example, information reception), transmitting (for example, information transmission), input, output, and accessing (for example, accessing data in a memory) operations. The terms "determining" and "deciding" can include "determination" and "decision" for resolving, selecting, choosing, establishing, and comparing operations. That is, the terms "determining" and "deciding" can include "determination" and "decision" for any operation.

The term "based on" used in the specification does not mean "only based on" unless otherwise stated. In other words, the term "based on" means both "only based on" and "at least based on".

When reference is made to elements in which terms "first," "second," and the like are used in the specification, the number or the order of the elements is not generally limited. These terms can be used in the specification as a method to conveniently distinguish two or more elements from each other. Accordingly, reference to first and second elements does not imply that only two elements are employed or the first element is prior to the second element in some ways.

The terms "include" and "including" and the modifications thereof are intended to be inclusive, similarly to the term "comprising", as long as they are used in the specification or the claims. In addition, the term "or" used in the specification or the claims does not mean exclusive OR.

In each aspect/embodiment described in the specification, for example, the order of the processes in the procedure, the sequence, and the flowchart may be changed unless a contradiction arises. For example, for the method described in the specification, elements of various steps are presented in the exemplified order. However, the invention is not limited to the presented specific order.

The aspects/embodiments described in the specification may be individually used, may be combined, or may be switched during execution. In addition, transmission of predetermined information (for example, transmission of "being X") is not limited to being performed explicitly, but may be performed implicitly (for example, the transmission of the predetermined information is not performed).

The invention has been described in detail above. It will be apparent to those skilled in the art that the invention is not limited to the embodiments described in the specification. Various modifications and changes can be made, without departing from the scope and spirit of the invention described in the claims. Therefore, the embodiments described in the specification are illustrative and do not limit the invention.

The present international application is based on and claims the benefit of priority of Japanese Patent Application No. 2017-001461 filed on Jan. 6, 2017, the entire contents of which are hereby incorporated by reference.

DESCRIPTION OF NOTATIONS 100 base station
110 transmission unit
120 reception unit
130 configuration information management unit
140 random access control unit
200 user equipment apparatus
210 transmission unit
220 reception unit
230 configuration information management unit
240 random access control unit

The invention claimed is:

1. A terminal, comprising:
a reception unit configured to receive, from a base station, control information indicating a pattern of retransmission schemes to be applied depending on a retransmission count, for retransmitting a preamble through random access to the base station, the retransmission schemes including beam switching and power ramping; and
a transmission unit configured to transmit the preamble according to the control information at timing of retransmitting the preamble,
wherein a retransmission scheme used to retransmit the preamble is selected from the retransmission schemes including the beam switching and the power ramping according to an increase in the retransmission count.

2. The terminal as claimed in claim 1, wherein
the transmission unit transmits a terminal aspect to the base station, and
the reception unit receives the control information indicating the pattern of retransmission schemes which is determined based on the terminal aspect.

3. The terminal as claimed in claim 1, wherein
the reception unit receives information about a maximum retransmission count of the preamble from the base station.

4. A base station, comprising:
a transmission unit configured to transmit, to a terminal, control information indicating a pattern of retransmission schemes to be applied depending on a retransmission count, for the terminal to retransmit a preamble through random access, the retransmission schemes including beam switching and power ramping; and
a reception unit configured to receive the preamble transmitted according to the control information,
wherein a retransmission scheme used to retransmit the preamble is selected from the retransmission schemes including the beam switching and the power ramping according to an increase in the retransmission count.

5. A random access method in a terminal, comprising the steps of:
receiving, from a base station, control information indicating a pattern of retransmission schemes to be applied depending on a retransmission count, for retransmitting a preamble through random access to the base station, the retransmission schemes including beam switching and power ramping; and
transmitting the preamble according to the control information at timing of retransmitting the preamble,
wherein a retransmission scheme used to retransmit the preamble is selected from the retransmission schemes including the beam switching and the power ramping according to an increase in the retransmission count.

6. A random access method in a base station, comprising:
transmitting, to a terminal, control information indicating a pattern of retransmission schemes to be applied depending on a retransmission count, for the terminal to retransmit a preamble through random access, the retransmission schemes including beam switching and power ramping; and
receiving the preamble transmitted according to the control information,
wherein a retransmission scheme used to retransmit the preamble is selected from the retransmission schemes including the beam switching and the power ramping according to an increase in the retransmission count.

7. The terminal as claimed in claim 2, wherein
the reception unit receives information about a maximum retransmission count of the preamble from the base station.

* * * * *